April 11, 1950  T. HAMILTON  2,503,482
CAMP TRAILER

Filed Feb. 18, 1946  2 Sheets-Sheet 1

INVENTOR
Tolbert Hamilton
BY
Philip A. Friedell
ATTORNEY

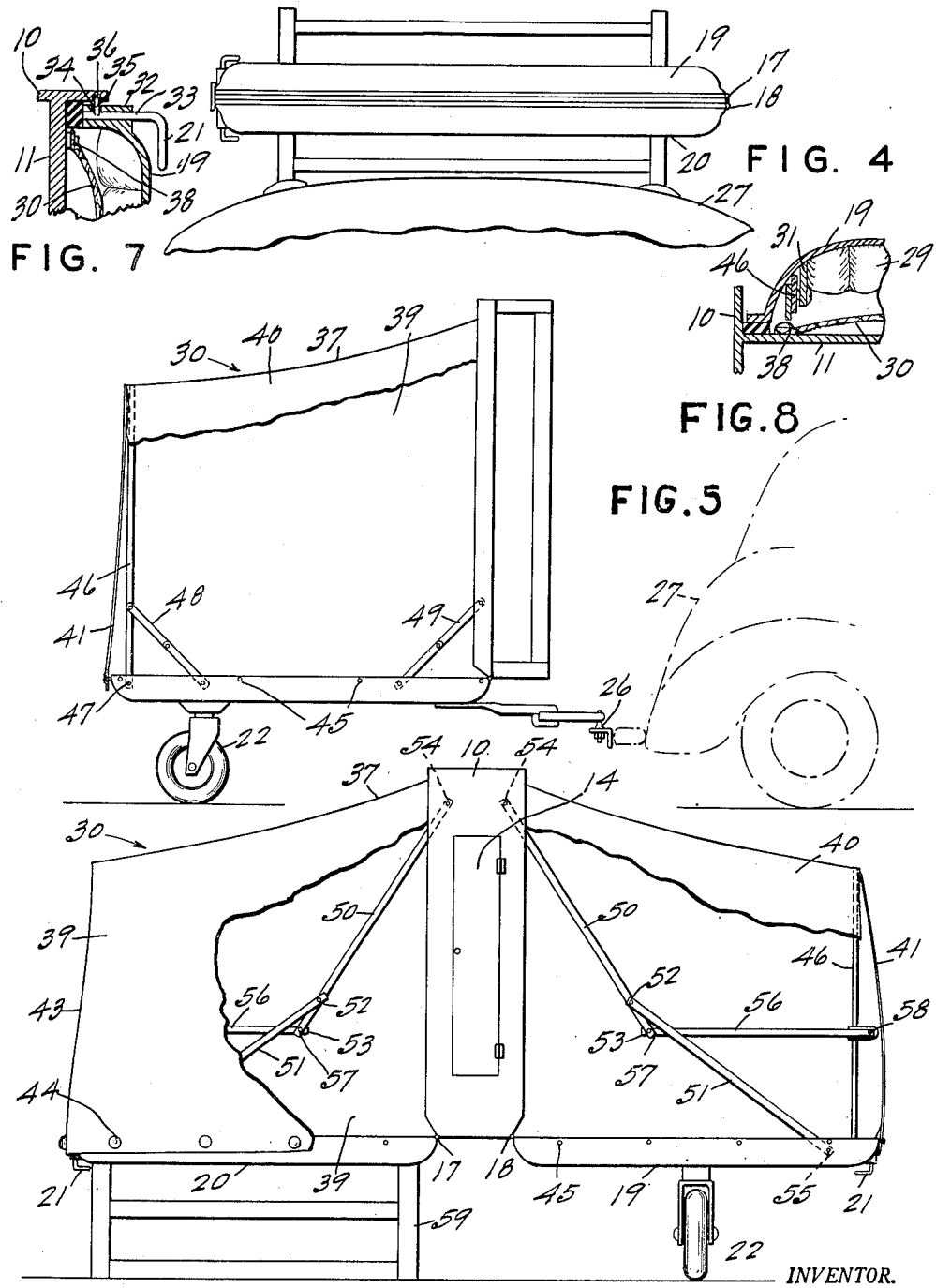

Patented Apr. 11, 1950

2,503,482

UNITED STATES PATENT OFFICE 2,503,482

CAMP TRAILER

Tolbert Hamilton, Oakland, Calif.

Application February 18, 1946, Serial No. 648,230

3 Claims. (Cl. 296—23)

This invention, a camp trailer, is an improvement over conventional equipment of the same type in that it is extremely compact, offers a minimum of wind resistance, is automatically erected merely by opening the trailer case and likewise automatically folded up when the trailer case is closed. Operation is substantially as simple and rapid as opening and closing a door, in fact the device consists essentially of a normally vertical body portion and two drop doors the dropping of which erects flexible waterproof coverings to form complete enclosures on the respective sides of the body, and when the doors are closed about their horizontal pivots or hinges, the enclosures fold within the body and doors. The only other operation necessary is that of buttoning the skirt end of the enclosure to the outsides of the doors, this being necessary because if they were fastened permanently to the inside, water would drain into the insides of the doors which are used as mattress supports.

This device, because of its extreme simplicity and compactness can also be arranged to be carried on top of a car, using no road wheel, and it can also be arranged for transport in a horizontal position, though the vertical position is preferred. It can also be made single or double, in the one case consisting simply of a pair of hinged covers, and in the other, a center housing and a hinged cover for each side.

The objects and advantages of the invention are as follows:

First, to provide camp equipment including a pair of hinged covers and a foldable enclosing structure which enclosing structure is automatically erected through relative opening of the covers, and automatically folded and stored through relative closing of the covers.

Second, to provide camp equipment as outlined which can be made in two compartments with a central dividing member and a hinged cover for each side including each a foldable enclosing structure operative to erected and folded position through opening and closing of the covers.

Third, to provide a structure as outlined which can be transported vertically or horizontally, on a conventional road wheel, or which can be arranged for transport supported on top of an automotive vehicle or the like.

Fourth, to provide a structure as outlined which automatically projects supports for the respective corners of the structure when the covers are opened, and automatically folds in and conceals the supports when the covers are closed.

Fifth, to provide a structure as outlined which is aesthetic in appearance, of minimum wind resistance, and requiring a minimum of space.

Sixth, to provide a structure as outlined which is simple in construction and arrangement and easy to operate.

In describing the invention reference will be made to the accompanying drawings, in which:

Fig. 4 shows the invention adapted for transport on top of an automotive vehicle or the like, a portion of the top being cut away to show the seal for the covers.

Fig. 5 is a side elevation of a modification of the invention and consisting of a pair of covers hinged together to form respectively one end wall and the bottom of the enclosure when opened, and with the enclosure adapted for manual erection.

Fig. 6 is another modification, the main portion being similar in all respects as to automatic erection, but having a compartment formed in the central partition member and having the road wheel mounted on one of the covers for horizontal trailing.

Fig. 7 is a fragmentary sectional elevation through the cover joint and latch.

Fig. 8 is an enlarged fragmentary sectional view through the cover sealing means and showing the connection of the tent to the partition.

Figure 1:
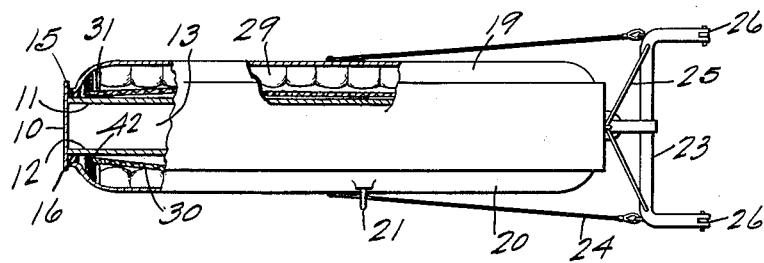
Fig. 1 is a top plan view of the preferred form of the invention with portions broken away to show internal structures.

In its preferred form the invention consists of a central partition member 10 which may consist of a simple single wall but preferably consisting of spaced walls 11 and 12 with intervening storage space 13, a door 14 (Fig. 6) providing access at one end. The compartment or partition is provided with an encompassing wall 10 which overhangs both sides of the compartment as indicated at 15 and 16 to protect the closing edges of the covers.

Hinged to the bottom of the partition and on the respective sides, as indicated at 17 and 18 are the covers 19 and 20 which are each provided with a suitable combined latch and handle 21. Thus the basic construction of the casing is similar to a double cover suitcase.

The device is mounted on a suitable road wheel or caster 22 and suitable coupling means 23 including stabilizing means 24 and 25 is provided for one end of the trailer, a suitable hitch 26 providing for coupling to an automotive vehicle 27. A manually adjustable support 28 is provided for the forward end, the trailer wheel being located relatively close to the rearward end to provide the support for that end.

The covers are each dished as shown for supporting and retaining a mattress or sleeping pad 29 and to provide space for bedding and for the flexible enclosure or tent 30, a suitable partition strip 31 providing space for the tent struts and posts.

The latch is illustrated in one form in Fig. 7 in which a boss 32 is formed at the edge of the cover and has a bore in which the latch spindle 33 is rotatable and which terminates in a handle 21. A transverse slot 34 opens into the bore for the spindle and a pin 35 passes through this slot and is fixed in the spindle, and this pin or latch cooperates with an indent or recess 36 in the overhanging structure or weather guard 10.

The tent or enclosure is made of any suitable flexible material such as canvas and consists of a roof portion 37 which has its free edge secured to the interior of the partition structure as indicated at 38; end walls 39 and 40 and side wall 41 all of which are attached to or continuous from the roof portion and have their inner edges secured to the inside of the partition structure as indicated at 42.

The adjoining edges 43 of the side and end walls may be fixedly or releasably connected, since the device will operate whether the corners of the tent are closed or not.

The lower end of the tent is provided with suitable means for anchoring, such as snap clasps 44 for cooperation with buttons 45 along the edges of the cover.

For manual opening and closing of the tent, the corner poles 46 are pivoted as indicated at 47 in Fig. 5, and suitable folding braces 48 and 49 are provided for support of the other cover which forms one side of the enclosure, and for the corner poles. This describes the simplest form of the invention.

For automatic operation as illustrated in Figs. 1, 2, 3 and 6, a link mechanism is used and consists of three pivotally connected struts for each end of the tent and including a pair of struts 50 and 51 which are pivoted together at 52 and provided with a stop 53, with the other ends respectively pivotally connected to the upper portion of the partition as indicated at 54 and to the forward end of the cover as indicated at 55; and a post strut 56 which has one end pivotally connected to a projecting end of the strut 50 as indicated at 57 with the other end having a pivotal connection 58 with the corner pole.

Figure 3:
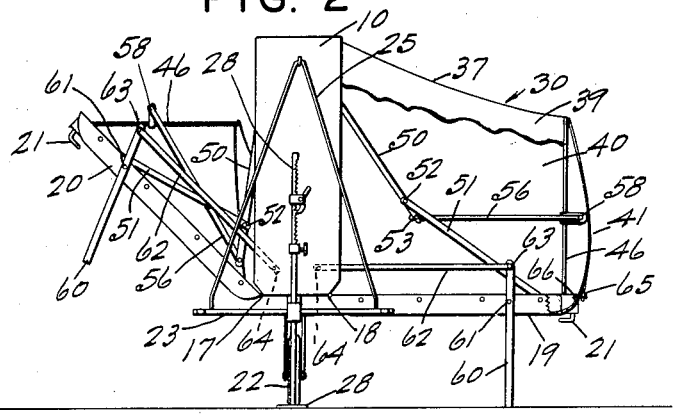
Fig. 3 is a front elevation of Fig. 1 showing one cover fully open and the tent or enclosure fully erected, and the other cover partly open showing the enclosure moving to an erected position.

Suitable legs or supports are provided as indicated at 59 in Fig. 6, or, as indicated in Fig. 3. Automatically opening and closing supports are provided and which consist of a leg 60 which is pivoted to the cover as indicated at 61 and extends thereabove with a link 62 pivotally connected at one end to the upward extension as indicated at 63 and to the partition structure at its other end as indicated at 64.

Figure 2:
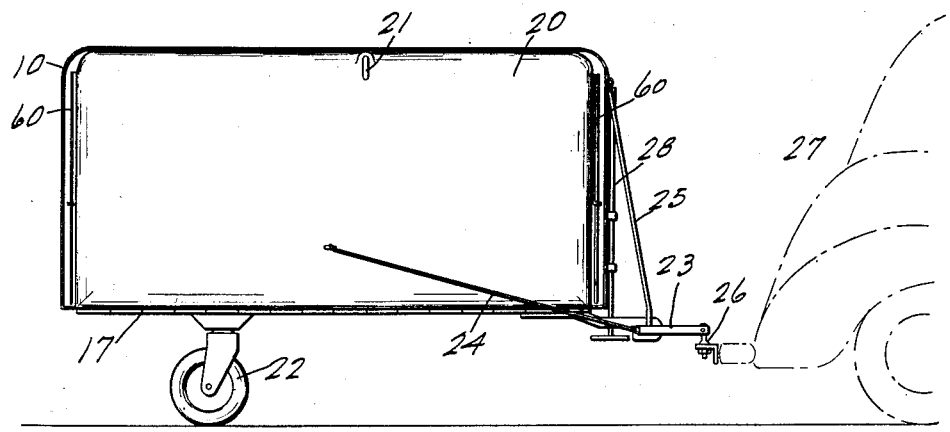
Fig. 2 is a side elevation of Fig. 1.

Referring to Figs. 1 and 2, the partition section is fully supported by the automotive vehicle as indicated at 26, at one end, and by the road wheel 22 at the other end. When the tent is to be set up, the covers are unlatched and dropped down. Dropping of the cover actuates the link mechanism, advancing the legs 60 to supporting position and drawing the links or struts 50 and 56 outwardly as indicated in an intermediate position in Fig. 3, left side, to the position shown on the right side. This simultaneously erects the poles 46 and stretches the roof, sides and ends of the tent to form a complete enclosure. The links 50 and 51 can then be separately forced to a straight line position for cooperation with the stop 53 if it is desired to have the canvas stretched very taut, and the lower edge can then be buttoned or snapped in place, this outside fastening being essential to prevent rain from draining into the cover, though it is possible to provide a flap to hang over the edge of the cover as indicated at 65 and have a strip sewed to the inside and secured to the inside of the rim of the cover as indicated at 66, under which conditions the outer drain flap can be turned in for closing the covers, and the entire unit will be ready for use as soon as the cover is opened.

When the cover is moved to a closed position the entire structure folds back into place, making the unit automatic for both, setting up, and striking camp, with nothing to do but release the latch and let down the cover or raise the cover and secure the latch.

I claim:

1. A camp trailer body comprising; a center section having top, bottom and end walls and a pair of spaced partitions recessed within the walls and spaced apart to form a storage enclosure therebetween and having a door to provide access thereto; a cover for each side of the center section and closable within the walls thereof, and being hinged along the respective sides of the center section to the bottom wall, and a manually operable latch at the upper end of each cover and cooperative latching means on said center section; said covers being recessed to locate and support each a mattress and bedding therein.

2. A structure as defined in claim 1; resilient sealing means mounted within said walls on the respective partitions to cooperate with the edges of the covers to seal the interior against moisture and dust when the covers are closed.

3. A structure as defined in claim 1; a tent structure for each side of said body and each having top, side and end walls affixed to the top and end walls of the center section and the top and ends of the covers; erecting linkage for each end of each tent and consisting each of a corner post for one end of the side wall and hinged at its lower end to the inside of the end of the cover adjacent its top; an intermediately hinged link including an upper link and a lower link with the upper link having one end hinged to the inside of the side wall of the center section adjacent the top, and the lower link having a hinged connection to the corner post, and a brace having one end hinged to said upper link intermediate its length and the other end hinged to the inside of the end wall of the cover whereby, upon releasing and lowering the cover, the hinged links and braces erect the corner posts and thus erect the tent.

TOLBERT HAMILTON.

REFERENCES CITED

The following references are of record in the file of this patent:

UNITED STATES PATENTS

| Number | Name | Date |
| --- | --- | --- |
| 512,273 | Brown | Jan. 9, 1894 |
| 1,229,534 | Shattuck | June 12, 1917 |
| 1,285,794 | Reid | Nov. 26, 1918 |
| 1,595,541 | Borah | Aug. 10, 1926 |
| 1,696,113 | Gilkison | Dec. 18, 1928 |
| 1,946,164 | Houdashelt | Feb. 6, 1934 |
| 2,009,548 | Goin et al. | July 30, 1935 |
| 2,113,448 | Hewitt | Apr. 5, 1938 |
| 2,216,584 | Boden | Oct. 1, 1940 |

FOREIGN PATENTS

| Number | Country | Date |
| --- | --- | --- |
| 773,100 | France | Aug. 25, 1934 |